United States Patent [19]
Saegusa et al.

[11] 3,821,125
[45] June 28, 1974

[54] CRYSTALLINE POLYETHYLENIMINE AND HYDRATE THEREOF

[75] Inventors: Takeo Saegusa; Hiroyasu Fujii, both of Kyoto; Hiroharu Ikeda, Yokohama, all of Japan

[73] Assignee: Japan Synthetic Rubber Co., Ltd., Tokyo, Japan

[22] Filed: July 10, 1972

[21] Appl. No.: 269,980

[30] Foreign Application Priority Data
July 16, 1971 Japan............................... 46-52416

[52] U.S. Cl. .............. 260/2 EN, 117/155, 162/135, 260/29.2 N
[51] Int. Cl............................................. C08g 33/02
[58] Field of Search.................................. 260/2 EN

[56] References Cited
UNITED STATES PATENTS
2,806,839  9/1957  Crowther et al. ................ 260/2 EN
3,052,669  9/1962  Gavlin et al. ...................... 260/2 EN
3,640,909  2/1972  Jones................................. 260/2 EN Primary Examiner—Wilbert J. Briggs, Sr.
Attorney, Agent, or Firm—Stevens, Davis, Miller & Mosher

[57] ABSTRACT

Crystalline polyethylenimine or hydrate thereof is prepared by hydrolyzing poly(N-formyl ethylenimine) at a temperature of $20°-130°C$. in the presence of an inorganic base. The crystalline polyethylenimine or its hydrate of this invention is in the state of solid or powder, and is insoluble in water at room temperature but soluble in hot water. This crystalline polyethylenimine and its hydrate may be useful as the water treating agent, paper sizing auxiliary agent, and trapping agents for heavy metals or polar compounds, etc.

8 Claims, No Drawings

CRYSTALLINE POLYETHYLENIMINE AND HYDRATE THEREOF

This invention relates to crystalline polyethylenimine or hydrate thereof and to a process for the production of the same.

It is known that polyethylenimine can be prepared by polymerizing ethylenimine in the presence of various cationic catalysts. However complete linear high polymers have not been obtained, because the active hydrogen in the secondary amine moiety in the polymer unit is so highly reactive that branching structures are formed in the resulting polymer as follows:

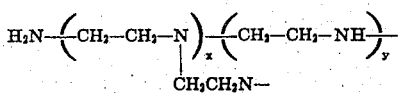

Therefore crystalline polyethylenimine has not been obtained by conventional methods since these conventional polyethylenimines inevitably have the branching structures mentioned above. Polyethylenimines having branching structures are not crystalline and highly viscous, which makes it difficult to handle.

It had been also disclosed to obtain polyethylenimine by hydrolysis of the polymerization product of 2-substituted-2-oxazoline, such as 2-methyl-2-oxazoline and 2-phenyl-2-oxazoline [T. Kagiya et al., Polymer Letters, 4, 441 (1966)]. By this method, however, completely hydrolized and crystalline product could not be obtained.

An object of the present invention is to provide crystalline polyethylenimine or hydrate thereof which can overcome the disadvantages of conventional polyethylenimines as mentioned above. Another object of the present invention is to provide a process for producing crystalline polyethylenimine or hydrate thereof. Further objects and advantages of the present invention will be apparent to one skilled in the art from the accompanying disclosure and discussion.

According to the present invention, crystalline polyethylenimine or hydrate thereof is obtained by hydrolyzing poly(N-formyl ethylenimine).

We had already found that poly(N-formyl ethylenimine) was prepared by subjecting 2-oxazoline to ring opening isomerization polymerization in the presence of a cationic catalyst in excellent yield. [T. Saegusa et al., Polymer J., 3, 35 (1972)].

The polymerization of 2-oxazoline can be carried out at 0° – 200°C, preferably at 50° – 180°C under normal pressure or elevated pressure. Aprotonic polar solvents such as dimethyl formamide, N-methyl-2-pyrolidone, acetonitrile, benzonitrile, nitro benzene and the like can be employed as the polymerization solvents. Cationic catalysts such as $BF_3O(C_2H_5)_2$, $SbF_5$, $(CH_3O)_2SO_2$, methyl-p-toluene sulfonate, p-toluene sulfonic acid, $H_2SO_4$, methyl iodide and the like may be employed as the polymerization catalysts.

The obtained poly(N-formyl ethylenimine) is crystalline. Crystalline linear polyethylenimine of the present invention can be prepared by hydrolyzing said poly(N-formyl ethylenimine) in the following manner:

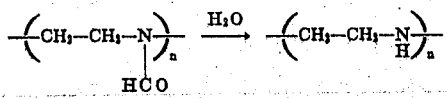

Hydrolysis of poly(N-formyl ethylenimine) may be carried out preferably at a temperature of 20° – 130°C, more preferably at 50° – 110°C, using a hydrolyzing reagent. As hydrolyzing reagents, inorganic bases such as sodium hydroxide, potassium hydroxide, lithium hydroxide and the like can be employed. In order to conduct the reaction completely, it is preferable to use one mole or more of the hydrolyzing reagent per mole of the monomer unit in the starting polymer. It is also preferable to use the starting polymer solution in concentration of 1 – 30 percent by weight.

This hydrolized product is then dried. When the hydrolyzed polymer is dried under reduced pressure at room temperature, crystalline polyethylenimine containing water (that is, polyethylenimine hydrate) is obtained. On the other hand, when the hydrolyzed polymer is dried under reduced pressure of 0.01 – 5 mm Hg at an elevated temperature, preferably at 50° – 110°C anhydrous crystalline polyethylenimine is obtained.

The resulting polyethylenimine or polyethylenimine hydrate is crystalline since it has linear structure. Crystalline polyethylenimine and hydrate thereof can easily be dissolved in organic solvents such as methanol, ethanol, chloroform, methylene chloride, pyridine, dimethylsulfoxide and the like. Crystalline polyethylenimine and its hydrate of this invention differ from those obtained by conventional methods in solubility to water. The former is insoluble in water at room temperature and soluble in hot water, whereas the latter is easily soluble in water at room temperature.

Since the polymer is in the state of solid or powder, it is easy to handle.

The crystalline polyethylenimine and its hydrate may be useful as the water treating agent, paper sizing auxiliary agent, and trapping agents for heavy metals or polar compounds, etc.

The following examples will serve to illustrate the present invention.

EXAMPLE 1

To 3 ml of water dissolving 1.07 g of poly(N-formyl ethylenimine) 9 ml of water dissolving 1 g of sodium hydroxide was added and the resulting solution was stirred for 3 hours at 98°C.

After cooling the reaction mixture to room temperature, white precipitate was produced. The precipitate was washed with water until the washed solution became neutral and then dried under reduced pressure of 0.2 mm Hg at 20°C for 24 hours to obtain 0.59 g of white powder in yield of 91 percent. The molecular weight of the polymer thus obtained was 1,200.

The infrared spectrum of the polymer was analogous to that of tetraethylenepentamine(pentamer of ethylenimine) and the NMR (Nuclear Magnetic Resonance) spectrum measured in $CD_3OD$ of the polymer showed the absorption band only at 7.26τ characteristic of $N-CH_2-$ portion. These results showed that the polymer is polyethylenimine. The melting point (Tm) of the polymer was 78.5°C according to the DSC (Differential Scanning Calorimetry) analysis. In the x-ray diffraction of the polymer, peaks due to crystal in terms of 2 θ value appeared at 18.3°, 20.3°, and 27.5°. These results showed that the polyethylenimine is crystalline. According to the elementary analysis of the polymer, 53.7% of C, 10.8% of H and 30.6% of N were found, while 55.77% of C, 11.70% of H and 32.53% of N were calculated for $(CH_2CH_2NH)_n$: the difference between the found and calculated values seems to be due to water in the polymer amounting to 5.5 percent. The water may be contained in the polymer as water of crystalization. This crystalline polyethylenimine hydrate is insoluble in water at room temperature but soluble at more than 70 C.

EXAMPLE 2

The hydrolyzed polymer obtained according to the same procedure of Example 1 was dried under reduced pressure (0.2 mm Hg) at 90 C for 10 hours. The polymer (0.55 g) was obtained in 85 percent yield.

According to the elementary analysis of the polymer 56.0 percent of C, 11.8 percent of H and 32.2 percent of N were found, which well met with values calculated for (CH CH NH). The polymer was found containing no water therein. The NMR spectrum of the polymer measured in CD OD showed the absorption band only at 7.27 due to N-CH - moiety. According to DSC analysis, Tm of the polymer was 58.5 C and glass transition temperature (Tg) was 23 C. X-ray diffraction of the polymer showed peaks at 11.8, 20.5 and 23.8 in terms of 2 value. These results showed that the polymer obtained was anhydrous crystalline polyethylenimine. This anhydrous crystalline polyethylenimine is insoluble in water at room temperature but soluble at more than 70 C.

What is claimed is:

1. A process for preparing crystalline polyethylenimine or hydrate thereof, comprising hydrolyzing poly(N-formyl ethylenimine) using an inorganic base.

2. A process according to claim, 1 wherein the inorganic base is selected from the group consisting of: sodium hydroxide or potassium hydroxide.

3. A process according to claim 1, wherein the hydrolysis of poly(N-formyl ethylenimine) is carried out using at least one mole of a hydrolyzing reagent per mole of the monomer unit in the starting polymer.

4. A process according to claim 1, wherein the hydrolysis of poly(N-formyl ethylenimine) is carried out using the starting polymer solution in concentration of 1 – 30 percent by weight.

5. A process according to claim 1, wherein after hydrolyzing poly(N-formyl ethylenimine), the resulting polymer is dried under reduced pressure at an elevated temperature to produce crystalline polyethylenimine.

6. A process according to claim 1, wherein after hydrolyzing poly(N-formyl ethylenimine), the resulting polymer is dried under reduced pressure at room temperature to produce crystalline polyethylenimine hydrate.

7. A process according to claim 1 wherein said hydrolysis is carried out at a temperature of 20 –130 C.

8. Crystalline polyethylenimine or hydrate thereof having the repeating monomer unit of (CH CH NH).

* * * * *